United States Patent
Bae et al.

(10) Patent No.: US 8,467,479 B2
(45) Date of Patent: Jun. 18, 2013

(54) APPARATUS AND METHOD FOR ESTIMATING I/Q UNBALANCE PARAMETERS IN OFDM RECEIVER

(75) Inventors: Jung-Hwa Bae, Suwon-si (KR); Sang-Min Bae, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 343 days.

(21) Appl. No.: 12/918,246

(22) PCT Filed: Feb. 19, 2009

(86) PCT No.: PCT/KR2009/000789
§ 371 (c)(1),
(2), (4) Date: Aug. 18, 2010

(87) PCT Pub. No.: WO2009/104909
PCT Pub. Date: Aug. 27, 2009

(65) Prior Publication Data
US 2010/0329394 A1    Dec. 30, 2010

(30) Foreign Application Priority Data

Feb. 19, 2008    (KR) .................. 10-2008-0014749

(51) Int. Cl.
*H03D 3/00*    (2006.01)
(52) U.S. Cl.
USPC ........................................................ 375/322
(58) Field of Classification Search
USPC ................... 375/260, 340, 296, 329, 317
See application file for complete search history.

(56) References Cited

U.S. PATENT DOCUMENTS

| 7,298,793 B2 * | 11/2007 | Wu et al. ................ 375/296 |
| 7,376,170 B2 * | 5/2008 | Scheck ................ 375/130 |
| 7,570,923 B2 * | 8/2009 | Kiss et al. ............ 455/67.14 |
| 7,609,772 B2 * | 10/2009 | Yu et al. ................ 375/260 |
| 2006/0182189 A1 * | 8/2006 | Yu et al. ................ 375/260 |
| 2006/0251189 A1 * | 11/2006 | Ruelke et al. ........... 375/329 |
| 2008/0056397 A1 * | 3/2008 | Li et al. ................ 375/260 |
| 2009/0122918 A1 * | 5/2009 | Li et al. ................ 375/317 |

FOREIGN PATENT DOCUMENTS

| JP | 11-331120 | 11/1999 |
| JP | 2007-180618 | 7/2007 |
| JP | 2007-208654 | 8/2007 |
| JP | 2007-228592 | 9/2007 |
| JP | 2008-017145 | 1/2008 |
| JP | 2008-312149 | 12/2008 |
| KR | 1020030047591 | 6/2003 |
| WO | WO 2004082232 | 9/2004 |

OTHER PUBLICATIONS

Written Opinion of the Int'l Searching Authority (Form PCT/ISA/237) (4 pages).

* cited by examiner

*Primary Examiner* — Jaison Joseph
(74) *Attorney, Agent, or Firm* — The Farrell Law Firm, P.C.

(57) ABSTRACT

Provided are an apparatus and a method for estimating I/Q unbalance parameters in an OFDM receiver. The apparatus includes an unbalance parameter estimator and an I/Q unbalance compensator. The unbalance parameter estimator estimates an amplitude difference and a phase difference depending on positions of pilot tones in a preamble of a received signal. The I/Q unbalance compensator compensates for an I/Q unbalance using the amplitude difference and the phase difference estimated by the unbalance parameter estimator.

12 Claims, 5 Drawing Sheets

APPARATUS AND METHOD FOR ESTIMATING I/Q UNBALANCE PARAMETERS IN OFDM RECEIVER

TECHNICAL FIELD

The present invention relates to an apparatus and a method for estimating I/Q unbalance parameters in an Orthogonal Frequency Division Multiplexing (OFDM) receiver. More particularly, the present invention relates to an apparatus and a method for estimating I/Q unbalance parameters using a pilot tone of a preamble.

BACKGROUND ART

Most of wireless communication terminals adopt and use an analog heterodyne reception scheme which down-converts RF signals into baseband signals or low Intermediate Frequency (IF) signals through a plurality of mixers and IF stages.

Since an existing reception structure using the heterodyne reception scheme uses a plurality of analog parts, a circuit construction is complicated and thus it is difficult to integrate the analog parts into one chip, and a volume increases. Furthermore, since consuming much power, the reception structure is not appropriate for a personal mobile communication device such as a Personal Digital Assistant (PDA) and a wireless terminal where miniaturization and mobility are important.

Therefore, a recently provided terminal adopts a reception structure based on direct-conversion scheme. Since the direct-conversion scheme performs only one time of frequency down conversion using one mixer, there is an advantage of minimizing an RF portion, and the direction-conversion scheme has a characteristic of being more flexible than the heterodyne scheme in an aspect of a hardware.

However, the direct-conversion scheme has a limitation of an I/Q unbalance generated by disagreement in phases and amplitudes between an I channel and a Q channel. The I/Q unbalance limitation is a factor deteriorating an entire receiver performance, and a circuit or signal processing for compensating for this I/Q unbalance is indispensably required. That is, a portion of RF signals is up-converted by the I/Q unbalance and moves to a baseband to cause interference to the down-converted signals. This interference increases as a degree of the I/Q unbalance increases, so that a received signal may become an irrecoverable state. Also, the I/Q unbalance greatly rotates constellation of received signals, thereby considerably deteriorating a Bit Error Rate (BER) performance after all.

As a most general method of compensating for the I/Q unbalance, there is a method in which when a test is performed after a terminal is manufactured, a test tone is generated in order to directly measure an I/Q unbalance, correction is made, and then the terminal is brought to the market. This method detects an image tone generated by an I/Q unbalance, and applies the detected image tone to an I/Q unbalance compensator. Also, examples of a method of compensating for an I/Q unbalance in a digital region include an adaptive signal processing method such as Least Means Square (LMS) and Recursive Least Square (RLS), and a signal processing method of Digital Signal Processing (DSP) such as a Symmetric Adaptive Decorrelation (SAD).

In an OFDM system, the above-described adaptive signal processing method is used, or a method of estimating an I/Q unbalance value from a plurality of OFDM symbols to perform compensation is used. However, such methods are not suitable for standards such as a 3rd Generation Partnership Project (3GPP) Long Term Evolution (LTE) and Mobile WiMAX. Also, in the method of generating the test tone, which is a square wave, inside a chip to compensate for an I/Q unbalance, when the test tone is generated during actual transmission/reception of data, collision between data and the test tone occurs, so that it is impossible to correct I/Q unbalance during actual transmission/reception of data. That is, according to this method, it is very difficult to adaptively take measures against an influence by an environment such as temperature change. Also, since the signal processing method of DSP that can perform correction in real-time includes repetition and convergence processes, a plurality of training symbols and much calculation time are required.

Besides these methods, a variety of methods for removing an I/Q unbalance from the OFDM scheme are being proposed, but they require the above-described convergence process, or require a specific pilot structure exclusively used for estimating an I/Q unbalance.

DISCLOSURE OF INVENTION

Technical Solution

An aspect of the present invention is to provide an apparatus and a method for estimating I/Q unbalance parameters in an OFDM receiver.

Another aspect of the present invention is to provide an apparatus and a method for compensating for an I/Q unbalance through a received OFDM preamble value.

According to an aspect of the present invention, an apparatus for estimating I/Q unbalance parameters in an Orthogonal Frequency Division Multiplexing (OFDM) receiver includes: an unbalance parameter estimator for estimating an amplitude difference and a phase difference depending on positions of pilot tones in a preamble of a received signal; and an I/Q unbalance compensator for compensating for an I/Q unbalance using the amplitude difference and the phase difference estimated by the unbalance parameter estimator.

According to another aspect of the present invention, a method for estimating I/Q unbalance parameters in an OFDM receiver includes: estimating an amplitude difference and a phase difference depending on positions of pilot tones in a preamble of a received signal; and compensating for an I/Q unbalance using the estimated amplitude difference and phase difference.

BRIEF DESCRIPTION OF DRAWINGS

The above and other objects, features and advantages of the present invention will become more apparent from the following detailed description when taken in conjunction with the accompanying drawings in which.

BEST MODE FOR CARRYING OUT THE INVENTION

Preferred embodiments of the present invention will be described herein below with reference to the accompanying drawings. In the following description, well-known functions or constructions are not described in detail since they would obscure the invention in unnecessary detail.

Exemplary embodiments of the present invention provide an apparatus and a method for estimating a phase difference and an amplitude difference between an I channel and a Q channel, generated by an I/Q unbalance, through one OFDM preamble value received from an OFDM receiver.

Figure 3:
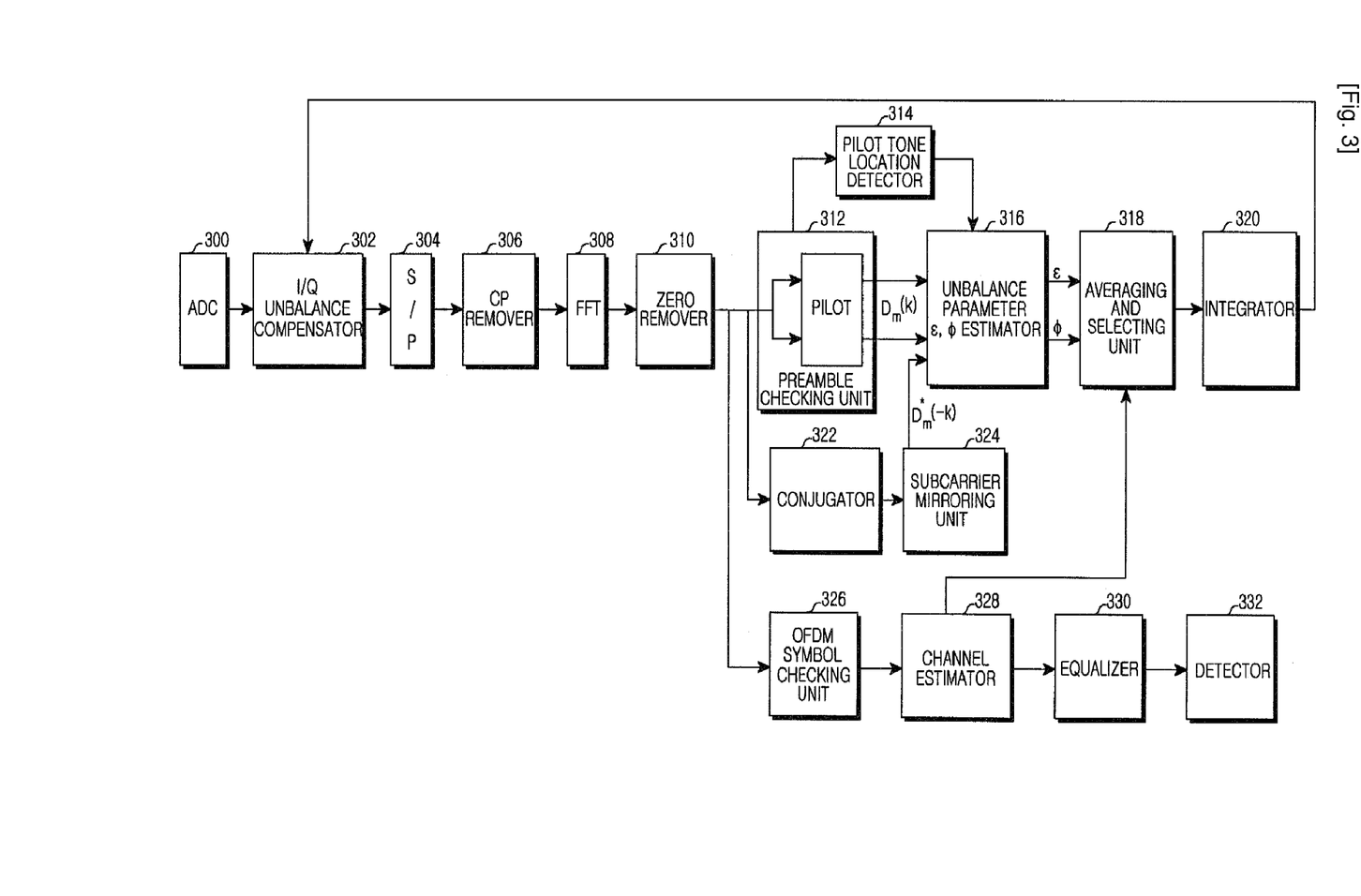
FIG. 3 is a block diagram for estimating I/Q parameters in an OFDM receiver according to an exemplary embodiment of the present invention.

FIG. 3 is a block diagram for estimating I/Q parameters in an OFDM receiver according to an exemplary embodiment of the present invention. Here, the OFDM receiver can include an Analog-to-Digital Converter (ADC) 300, an I/Q unbalance compensator 302, a Serial-to-Parallel Converter (S/P) 304, Cyclic Prefix (CP) remover 306, a Fast Fourier Transform (FFT) 308, a zero remover 310, a preamble checking unit 312, a pilot tone location detector 314, an unbalance parameter $\epsilon$, $\phi$ estimator 316, an averaging and selecting unit 318, an integrator 320, a conjugator 322, a subcarrier mirroring unit 324, an OFDM symbol checking unit 326, a channel estimator 328, an equalizer 330, and a detector 332.

Referring to FIG. 3, the ADC 300 quantizes a signal received from an RF front end (not shown) into a digital signal, and outputs the quantized digital signal to the I/Q unbalance compensator 302.

The I/Q unbalance compensator 302 compensates for the signal input from the ADC 300 using a phase difference and an amplitude difference input through the integrator 320, and then outputs the compensated signal to the S/P 304.

The S/P 304 converts a signal input in series into a parallel signal and outputs the same. The CP remover 306 removes a CP from a signal output from the S/P 304, and then outputs the signal to the FFT 308. The FFT 308 performs FFT on the signal output from the CP remover 306, and outputs the signal to the zero remover 310. The zero remover 310 removes a zero value from the signal output from the FFT 308, and outputs the signal to the preamble checking unit 312, the conjugator 322, and the OFDM symbol checking unit 326.

The preamble checking unit 312 checks a preamble of a signal output from the zero remover 310, outputs a preamble signal to the pilot tone location detector 314, and outputs a pilot signal of the preamble to the unbalance parameter $\epsilon$, $\phi$ estimator 316.

The pilot tone location detector 314 detects the location of a pilot tone from the preamble signal, and outputs the detected location to the unbalance parameter $\epsilon$, $\phi$ estimator 316.

Figure 1:
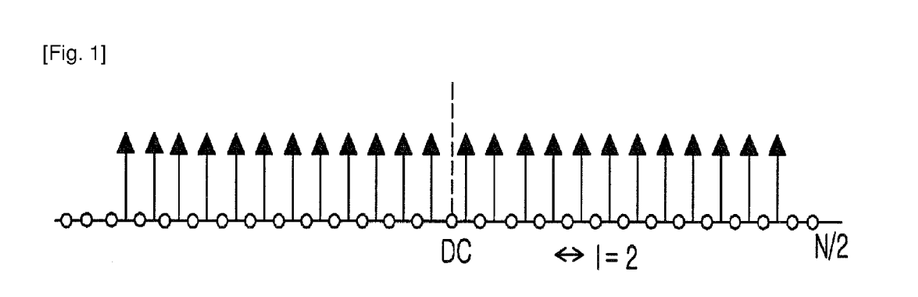
FIG. 1 is a view illustrating a preamble structure of an OFDM where I=2.
Figure 2:
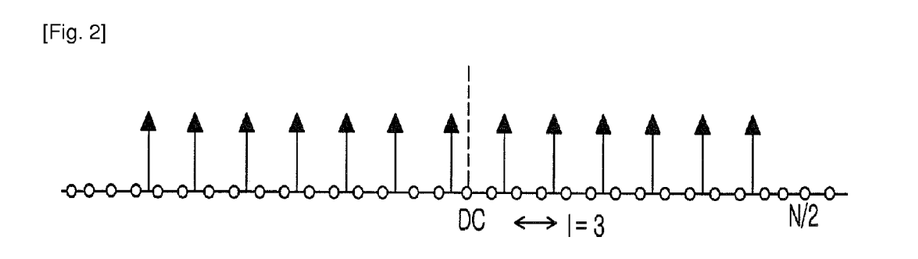
FIG. 2 is a view illustrating a preamble structure of an OFDM where I=3.

The unbalance parameter $\epsilon$, $\phi$ estimator 316 estimates an amplitude difference and a phase difference using the preamble signal whose pilot tone location has been detected and a signal input via the subcarrier mirroring unit 324, and outputs the estimated amplitude difference and phase difference to the averaging and selecting unit 318. At this point, when pilot tones exist symmetrically with respect to a DC in the preamble as illustrated in FIG. 1, the pilot tone location detector 314 estimates the amplitude difference and the phase difference using Equation (1). When pilot tones do not exist symmetrically with respect to a DC in the preamble as illustrated in FIG. 2, the pilot tone location detector 314 estimates the amplitude difference and the phase difference using Equation (2).

MathFigure 1
[Math. 1]

$$\hat{\epsilon} = \left| \frac{a_1^*(-k) - a_2(-k)}{a_1^*(-k) + a_2(-k)} \right| - 1 \quad (1)$$

$$\hat{\phi} = \angle \frac{a_1^*(-k) - a_2(-k)}{a_1^*(-k) + a_2(-k)} - 1$$

MathFigure 2
[Math. 2]

$$\hat{\epsilon} = \left| \frac{D_m^*(-k) - D_m(k)}{D_m^*(-k) + D_m(k)} \right| - 1 \quad (2)$$

$$\hat{\phi} = \angle \frac{D_m^*(-k) - D_m(k)}{D_m^*(-k) + D_m(k)}$$

where
$\hat{\epsilon}$
is an amplitude difference,
$\hat{\phi}$
is a phase difference, $\alpha_1^*(-k)$ is $K_1^*H^*(-k)$, $\alpha_2(-k)$ is $K_2H^*(-k)$, $K_1 = (\tfrac{1}{2})(1+(1+\epsilon)\exp(-j\phi))$, $K_2 = (\tfrac{1}{2})(1-(1+\epsilon)\exp(j\phi))$, H(k) is a channel of a subcarrier k, and $D_m(k)$ is a received signal at a subcarrier k of an m-th OFDM symbol.

Now, a process of obtaining Equations (1) and (2) is described.

A process of obtaining Equation (1) is described. First, Equation (3) below expressing a received signal at a subcarrier index k of an m-th OFDM symbol, and Equation (4) below expressing a received signal at a subcarrier index k+1 of the m-th OFDM symbol are required.

MathFigure 3

[Math.3]

$$D_m(k) = K_1 H_m(k) S_m(k) + K_2 H_m^*(-k) S_m^*(-k) + N_m(k) \quad (3)$$

MathFigure 4

[Math.4]

$$D_m(k+l) = K_1 H_m(k+l) S_m(k+l) + K_2 H_m^*(-k-l) S_m^*(-k-l) + N_m(k+l) \quad (4)$$

where a range of k is from $-(n/2)-1$ to $n/2$, meaning an FFT index, $K_1 = (\tfrac{1}{2})(1+(1+\epsilon)\exp(-j\phi))$, $\epsilon$ is an amplitude difference between an I channel and a Q channel, $\phi$ is a phase difference between the I channel and the Q channel, $H_m(k)$ is a channel of a subcarrier k, $S_m(k)$ is a transmitted data symbol, and $$N_m(k) = K_1 W_m(k) + K_2 W_m^*(-k)(W_m(k))$$

is a noise at a subcarrier index k of an m-th OFDM symbol.

To obtain $K_1$ and $K_2$ related to a phase difference and an amplitude difference between an I channel and a Q channel from Equations (3) and (4), a solution of the two simultaneous equations is obtained under the assumption of $H_1(k) = H_1(k+1) = H(k)$. By the above channel condition, an assumption of $H_1(-k) = H_1(-k-1) = H(-k)$ is met for a channel in a mirror side. When the two terms on the right in Equations (3) and (4) are removed, information regarding $K_1$ can be obtained. That is, as expressed in Equations (5) and (6), when the two sides of the two Equations are multiplied by an appropriate pilot signal value, respectively, and then the two Equations are subtracted, a value related to $K_1H(k)$ can be obtained as expressed in Equation (7).

MathFigure 5
[Math. 5]

$$D_m(k)S_m^*(-k-l) = K_1H_m(k)S_m(k)S_m^*(-k-l) + \quad (5)$$
$$K_2H_m^*(-k)S_m^*(-k)S_m^*(-k-l) + N_m(k)S_m^*(-k-l)$$

MathFigure 6
[Math. 6]

$$D_m(k+l)S_m^*(-k) = K_1H_m(k+l)S_m^*(-k)S_m(k+l) + \quad (6)$$
$$K_2H_m^*(-k-l)S_m^*(-k)S_m^*(-k-l) + N_m(k+l)S_m^*(-k)$$

MathFigure 7
[Math. 7]

$$a_1(k) = K_1H(k) \quad (7)$$
$$= \frac{D_m(k)S_m^*(-k-l) - D_m(k+l)S_m^*(-k) + N_m(k)S_m^*(-k-l) - N_m(k+l)S_m^*(-k)}{S_m(k)S_m^*(-k-l) - S_m(k+l)S_m^*(-k)}$$

Here, Equation (7) should meet a condition of Equation (8) below lest a denominator of Equation (7) become zero.

MathFigure 8

[Math. 8]

$$S_m(k)S_m^*(-k-l) - S_m(k+l)S_m^*(-k) \neq 0 \quad (8)$$

Also, when Equations are solved using Equations (3) and (4), Equation (9) can be obtained.

MathFigure 9
[Math. 9]

$$a_1(-k) = K_2H^*(-k) \quad (9)$$
$$= \frac{D_m(k)S_m(k+l) - D_m(k+l)S_m(k) + N_m(k)S_m(k+l) - N_m(k+l)S_m(k)}{S_m^*(-k)S_m(k+l) - S_m^*(-k-l)S_m(k)}$$

Here, when Equations (8) and (9) are solved in order to obtain only terms related to a phase difference and an amplitude difference, which are terms related to an I/Q unbalance, Equation (10) below can be obtained.

MathFigure 10
[Math. 10]

$$\frac{a_1^*(-k) - a_2(-k)}{a_1^*(-k) + a_2(-k)} = \frac{(K_1^* - K_2)H^*(-k) + N_1}{(K_1^* + K_2)H^*(-k) + N_2} \quad (10)$$
$$= (1+\varepsilon)e^{j\phi} + \text{noise term}$$

In Equation (10), $N_1$ and $N_2$ are terms related to a noise, and expressed as in Equation (11) below.

MathFigure 11
[Math. 11]

$$N_1 = \frac{S_m(k+l)\{N_m^*(-k) - N_m(k)\} - S_m(k)\{N_m^*(-k-l) - N_m(k+l)\}}{S_m(k)S_m^*(-k-l) - S_m(k+l)S_m^*(-k)} \quad (11)$$

$$N_2 = \frac{S_m(k+l)\{N_m^*(-k) - N_m(k)\} - S_m(k)\{N_m^*(-k-l) - N_m(k+l)\}}{S_m(k)S_m^*(-k-l) - S_m(k+l)S_m^*(-k)}$$

Therefore, in the case where pilot tones exist symmetrically with respect to a DC in the preamble, received preamble data at a subcarrier of itself, an adjacent subcarrier, and two mirrored subcarriers of the above-mentioned subcarriers, that is, at four subcarrier indexes of k, k+1, -k, and -k-1, and information of the pilot tones are required in order to obtain estimated values of one phase difference and one amplitude difference.

Also, when the noise term is absent in the result of Equation (10), Equation (10) is expressed in terms of a phase difference and an amplitude difference as illustrated in Equation (12).

MathFigure 12
[Math. 12]

$$\frac{a_1^*(-k) - a_2(-k)}{a_1^*(-k) + a_2(-k)} = \frac{K_1 - K_2^*}{K_1^* + K_2} = (1+\varepsilon)e^{j\phi} \quad (12)$$

$a_1^*(-k)$ in Equation (12) is obtained as in Equation (13) below by Equation (7).

MathFigure 13
[Math. 13]

$$a_1^*(-k) = K_1^*H^*(-k) \quad (13)$$
$$= \frac{D_m^*(-k)S_m(k+l) - D_m^*(-k-l)S_m(k) + N_m^*(-k)S_m(k+l) - N_m^*(-k-l)S_m(k)}{S_m^*(-k)S_m(k+l) - S_m^*(-k-l)S_m(k)}$$

Therefore, a final estimated amplitude difference and phase difference are obtained as in Equation (1).

Also, a process for obtaining Equation (2) is described. Since a null value of zero exists in a mirrored pilot in the case where pilot tones do not exist symmetrically with respect to the DC in the preamble, a received signal at a null subcarrier index k is given by Equation (14).

MathFigure 14

[Math.14]

$$D_m(k) = K_2H_m^*(-k)S_m^*(-k) + N_m(k) \quad (14)$$

Since a signal of itself is a value of zero in Equation (14), a term related to $K_1$ vanishes. Also, a received signal at a subcarrier index -k on the opposite side of a DC where pilots exist is given by Equation (15).

MathFigure 15

[Math.15]

$$D_m(-k) = K_1H_m(-k)S_m(-k) + N_m(-k) \quad (15)$$

Here, Equation (16) below can be obtained using Equations (14) and (15).

MathFigure 16
[Math. 16]

$$\frac{D_m^*(-k) - D_m(k)}{D_m^*(-k) + D_m(k)} = \frac{K_1^* - K_2}{K_1^* + K_2} \quad (16)$$
$$= (1 + \varepsilon)e^{j\phi}$$

An I/Q unbalance can be estimated regardless of an influence of a channel and a gain influence of a pilot signal using Equation (16). An amplitude difference and a phase difference where all pilots are averaged to reduce an estimation error in one preamble are estimated by Equation (2).

When the pilot tones exist symmetrically with respect to the DC, the averaging and selecting unit 318 calculates an average for only estimation values whose channel gain is greater than power of a noise and having higher correlation than those of adjacent pilot tones, and outputs the average to the I/Q unbalance compensator 302 through the integrator 320. On the other hand, when the pilot tones do not exist symmetrically with respect to the DC, the averaging and selecting unit 318 calculates an average for only estimation values of pilot tones where the channel gain is greater than power of a noise, and outputs the average to the I/Q unbalance compensator 302 through the integrator 320. Here, when the pilot tones exist symmetrically with respect to the DC and $H^*(-k)$ of Equation (10) has a value smaller than a noise, an estimation error becomes very large. Therefore, the estimation error is reduced by including only pilot tones of pilots whose channel gains are good after the channel estimator 328 estimates a channel. That is, the estimation error is reduced by excluding terms that do not satisfy Equation (17) below.

MathFigure 17

[Math.17]

$$|H^*(-k)|^2 > \alpha \cdot \sigma_N \quad (17)$$

where
$\sigma_N$
is noise power and $\alpha$ is an arbitrary real number. The number of subcarriers selected from calculation of Equation (1) can be controlled through a value $\alpha$. Also, since it is assumed that $H_1(k)=H_1(k+1)=H(k)$ in the case where the pilot tones exist symmetrically with respect to the DC, performance improvement can be achieved by excluding subcarriers where a frequency selection degree has a large value. That is, only subcarriers satisfying Equation (18) below are selected and applied to Equation (1).

MathFigure 18

[Math.18]

$$|H_1(k) - H_1(k+l)| < \beta \quad (18)$$

$\beta$ in Equation (18) is a real number meaning correlation. The number of subcarriers selected from calculation of Equation (1) can be controlled through the value $\beta$.

Also, even when the pilot tones exist symmetrically with respect to the DC, pilots of a portion where a noise is large are excluded from a calculation process of Equation (2) using Equation (17). In other words, in the case where the pilot tones exist symmetrically with respect to the DC, an estimation error is obtained by comparing a value of a pilot tone interfering with a null carrier with a null value, which is a pilot tone of an original signal itself. Therefore, interfered pilot tones should have a better gain than a noise in order to reduce an estimation error.

Figure 4:
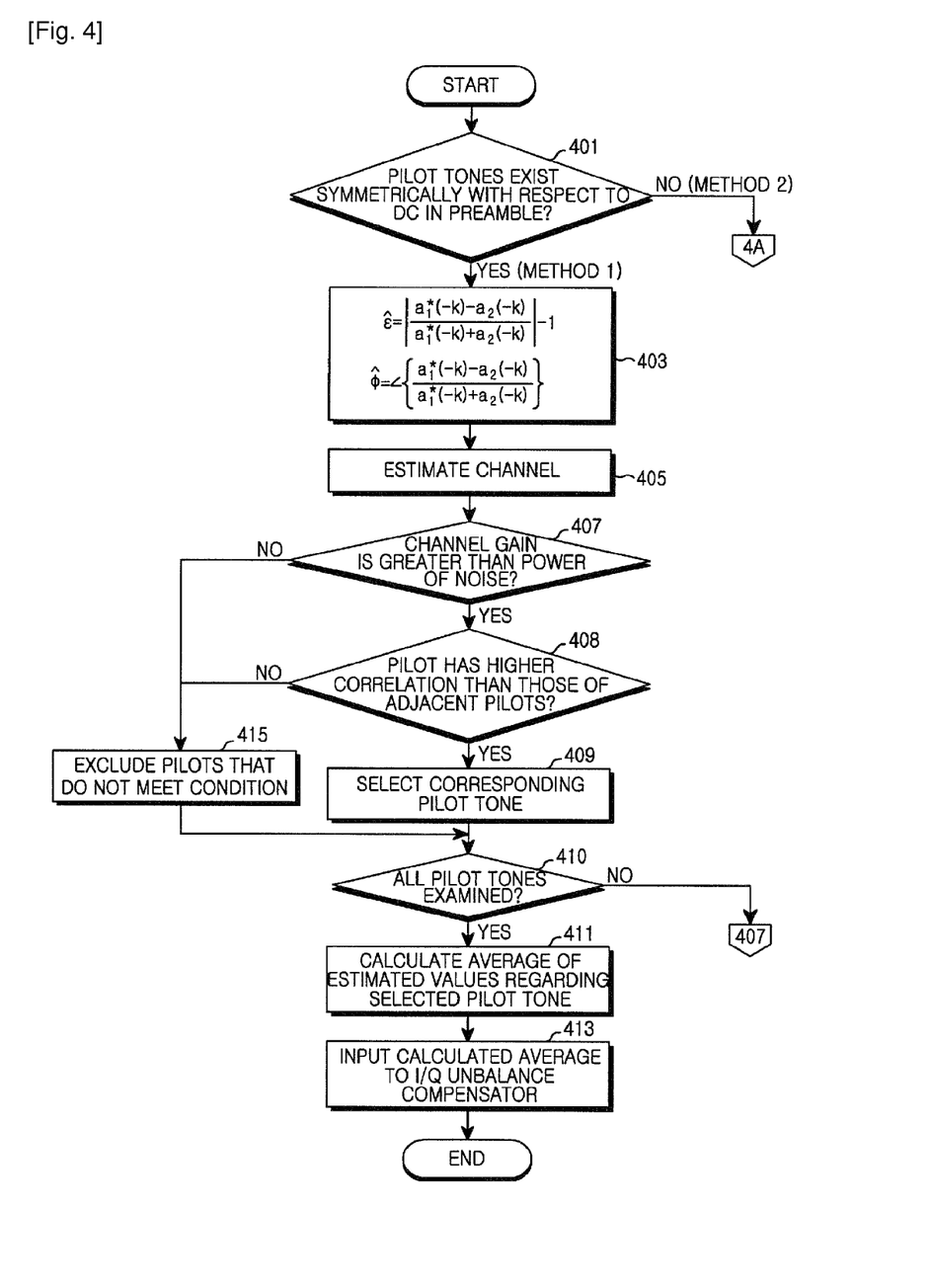
FIGS. 4 and 5 are flowcharts illustrating a procedure for estimating I/Q parameters in an OFDM receiver according to an exemplary embodiment of the present invention.
Figure 5:
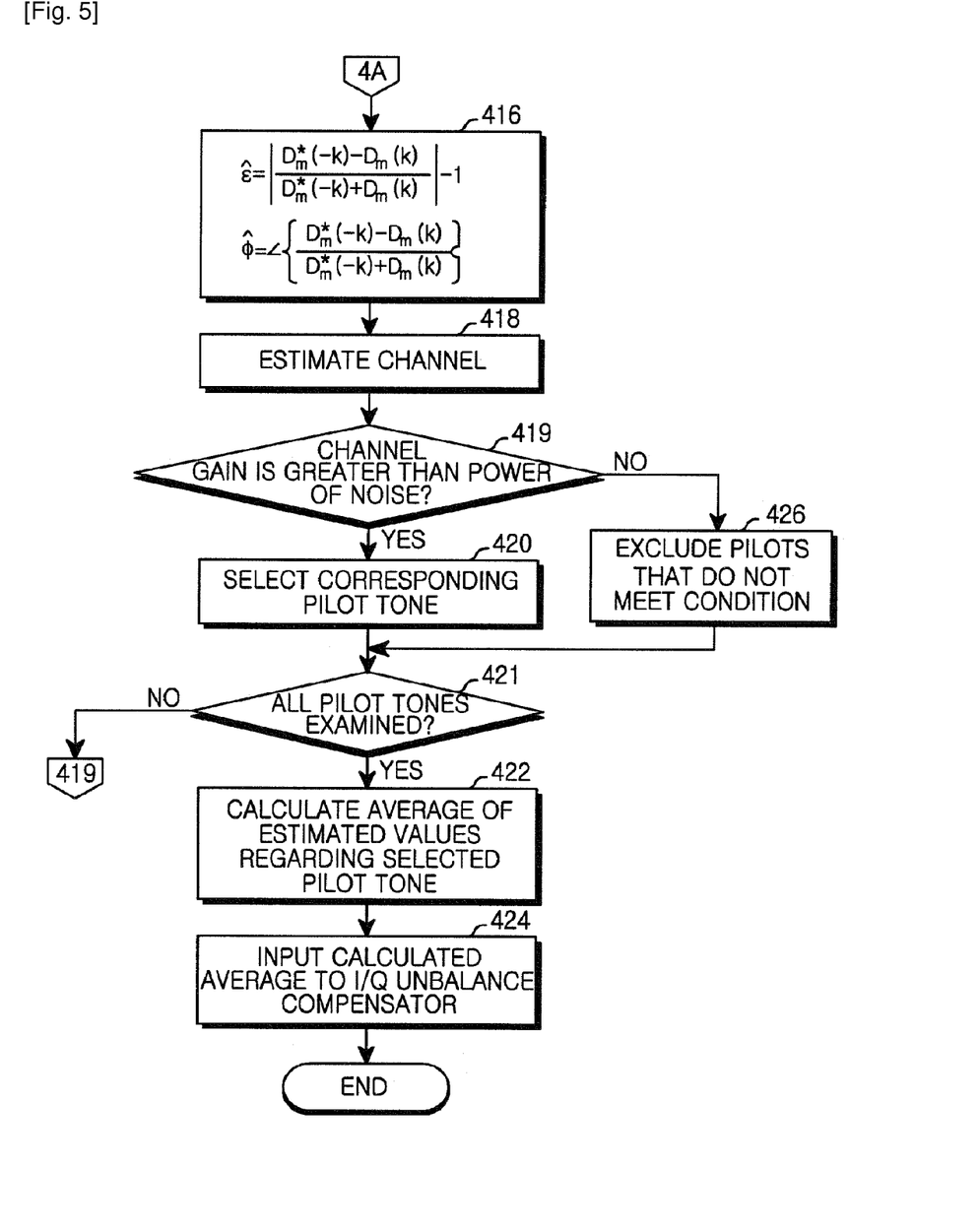

FIGS. 4 and 5 are flowcharts illustrating a procedure for estimating I/Q parameters in an OFDM receiver according to an exemplary embodiment of the present invention.

Referring to FIGS. 4 and 5, in step 401, the OFDM receiver examines whether pilot tones exist symmetrically with respect to the DC in the preamble. Here, a case where the pilot tones exist symmetrically with respect to the DC in the preamble means that pilot signals exist in a symmetric configuration around the DC as illustrated in FIG. 1. A case where the pilot tones do not exist symmetrically with respect to the DC in the preamble means that pilots move one by one for each sector and interference is not generated between pilots as illustrated in FIG. 2.

When the pilot tones exist symmetrically with respect to the DC in the preamble, the OFDM receiver calculates an amplitude difference $\epsilon$ and a phase difference $\phi$ as illustrated in Equation (1) in step 403.

After that, in step 405, the OFDM receiver performs channel estimation on a received OFDM signal, and examines whether a channel gain is greater than the power of a noise in step 407. Here, the reason whether the channel gain is greater than the power of the noise is examined is to exclude terms that do not meet the condition of Equation (17) and to input an estimation value having a small error to an I/Q unbalance compensator because when the size of a pilot signal has a smaller value than that of the noise, an estimation error becomes very large.

When the channel gain is smaller than the power of the noise, the OFDM receiver excludes pilot tones that do not meet the condition in step 415, and goes back to step 410 to perform subsequent steps.

Meanwhile, when the channel gain is greater than the power of the noise, the OFDM receiver examines whether a received pilot signal has higher correlation than adjacent pilot signals in step 408. Here, the reason whether the received pilot signal has higher correlation than the adjacent pilot signals is examined is to reduce an estimation error even more, that is, to reduce an estimation error by excluding terms that do not meet the condition of Equation (18), i.e., pilot tones having low correlation.

When the received pilot signal has lower correlation than the adjacent pilot signals, the OFDM receiver performs step 415 to perform subsequent steps. Meanwhile, when the received pilot signal has higher correlation than the adjacent pilot signals, the OFDEM receiver selects a corresponding pilot tone in step 409, and checks whether all pilot tones have been examined in step 410.

When all the pilot tones have not been examined, the OFDM receiver goes back to step 407 to examine other pilot tones. Meanwhile, when all the pilot tones have been examined, the OFDM receiver calculates an average of estimation values regarding the selected pilot tone in step 411, and inputs the calculated average to the I/Q unbalance compensator in step 413. After that, the OFDM receiver ends an algorithm according to the exemplary embodiment of the present invention.

Meanwhile, when the pilot tones do not exist symmetrically with respect to the DC in the preamble in step 401, the OFDM receiver performs step 416 to calculate an amplitude difference $\epsilon$ and a phase difference $\phi$ as expressed in Equation (2).

After that, in step 418, the OFDM receiver performs channel estimation on a received OFDM signal, and examines whether a channel gain is greater than the power of a noise in step 419. Here, the reason whether the channel gain is greater than the power of the noise is examined is to exclude terms that do not meet the condition and to input an estimation value having a small error to the I/Q unbalance compensator because when the size of a pilot signal has a smaller value than that of the noise, an estimation error becomes very large.

When the channel gain is smaller than the power of the noise, the OFDM receiver excludes pilot tones that do not meet the condition in step 426, and goes to step 421 to perform subsequent steps.

Meanwhile, when the channel gain is greater than the power of the noise, the OFDM receiver performs step 420 to select a corresponding pilot tone, and checks whether all pilot tones have been examined in step 421. When all the pilot tones have not been examined, the OFDM receiver goes back to step 419 to examine other pilot tones. Meanwhile, when all the pilot tones have been examined, the OFDM receiver calculates an average of estimation values regarding the selected pilot tone in step 422, and input the calculated average to the I/Q unbalance compensator in step 424. After that, the OFDM receiver ends an algorithm according to the exemplary embodiment of the present invention.

Figure 6:
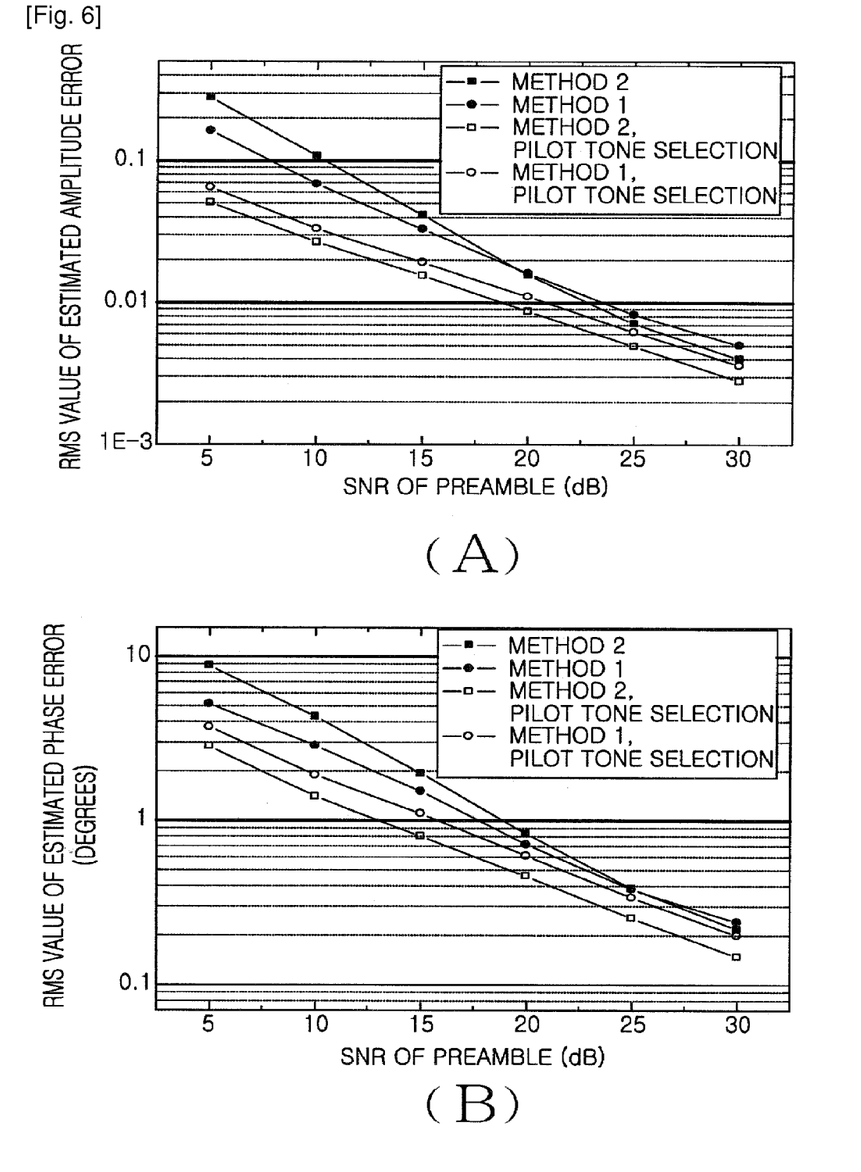
FIGS. 6A and 6B are graphs illustrating an amplitude error and a phase error estimated by using a preamble of 802.16e Mobile WiMAX currently being used.

FIGS. 6A and 6B are illustrates an amplitude error and a phase error estimated using a preamble of 802.16e Mobile WiMAX currently being used. This result shows root mean square (rms) values obtained by a computer simulation under condition that an amplitude error is 10% and a phase error is 5° in an I/Q unbalance. Since Mobile WiMAX uses a preamble where I=3 as illustrated in FIG. 2 but three sectors are used for one cell, pilot tones of the preamble are moved by one by one in order to remove interferences between these sectors. Therefore, since pilots exist symmetrically with respect to a DC in only one sector of the three sectors, Equation (1) is used. Since in the other two sectors, null carrier exists at a place where pilots are symmetrical, Equation (2) is used.

Examination of a result obtained by using Equation (1) shows that an rms value to which Equations (17) and (18) have been applied is small, and a result by Equation (2) has a wider width compared to a result by Equation (1). That is, since I=3 in Mobile WiMAX, a case that does not require the assumption of $H_1(k)=H_1(k+3)=H(k)$ represents better performance. Particularly, when the condition of Equation (17) is applied at a low Signal-to-Noise Ratio (SNR), a great gain can be obtained.

As described above, according to the present invention, an OFDM receiver estimates and compensates for a phase difference and an amplitude difference between an I channel and a Q channel through received one OFDM preamble value, so that the present invention has effects of being simply realized and correcting an I/Q unbalance in real-time.

Although the invention has been shown and described with reference to certain preferred embodiments thereof, it will be understood by those skilled in the art that various changes in form and details may be made therein without departing from the spirit and scope of the invention as defined by the appended claims. Therefore, the scope of the present invention should not be limited to the above-described embodiments but should be determined by not only the appended claims but also the equivalents thereof.

The invention claimed is:

1. An apparatus for estimating I/Q unbalance parameters in an Orthogonal Frequency Division Multiplexing (OFDM) receiver, the apparatus comprising:

an unbalance parameter estimator for estimating an amplitude difference and a phase difference depending on positions of pilot tones in a preamble of a received signal; and an I/Q unbalance compensator for compensating for an I/Q unbalance using the amplitude difference and the phase difference estimated by the unbalance parameter estimator.

2. The apparatus of claim 1, wherein when the pilot tones exist symmetrically with respect to a Direct Current (DC), the unbalance parameter estimator estimates the amplitude difference and the phase difference using Equation 19:

$$\hat{\varepsilon} = \left| \frac{a_1^*(-k) - a_2(-k)}{a_1^*(-k) + a_2(-k)} \right| - 1 \quad (19)$$

$$\hat{\phi} = \angle \frac{a_1^*(-k) - a_2(-k)}{a_1^*(-k) + a_2(-k)} - 1.$$

where
$\hat{\varepsilon}$
is an amplitude difference,
$a_1^*(-k)$ is $K_1^*H^*(-k)$, $a_2(-k)$ is $K_2H^*(-k)$,
$K_1=(\frac{1}{2})(1+(1+\varepsilon)\exp(-j\phi))$,
$K_2=(\frac{1}{2})(1-(1+\varepsilon)\exp(j\phi))$, and $H(k)$ is a channel of a subcarrier k.

3. The apparatus of claim 2, wherein the estimating of the amplitude difference and the phase difference comprises comparing the pilot tones with a noise and selecting a pilot tone greater than the noise.

4. The apparatus of claim 2, wherein the estimating of the amplitude difference and the phase difference comprises selecting a pilot tone having higher correlation than those of adjacent pilot tones.

5. The apparatus of claim 1, wherein when the pilot tones do not exist symmetrically with respect to a Direct Current (DC), the unbalance parameter estimator estimates the amplitude difference and the phase difference using Equation 20:

$$\hat{\varepsilon} = \left| \frac{D_m^*(-k) - D_m(k)}{D_m^*(-k) + D_m(k)} \right| - 1 \quad (20)$$

$$\hat{\phi} = \angle \frac{D_m^*(-k) - D_m(k)}{D_m^*(-k) + D_m(k)}.$$

where
$\hat{\varepsilon}$
is an amplitude difference,
$\hat{\phi}$
is a phase difference, and $D_m(k)$ is a received signal at a subcarrier k of an m-th OFDM symbol.

6. The apparatus of claim 5, wherein the estimating of the amplitude difference and the phase difference comprises comparing the pilot tones with a noise and selecting a pilot tone greater than the noise.

7. A method for estimating I/Q unbalance parameters in an OFDM receiver, the method comprising:

estimating an amplitude difference and a phase difference depending on positions of pilot tones in a preamble of a received signal; and compensating for an I/Q unbalance using the estimated amplitude difference and phase difference.

8. The method of claim 7, wherein when the pilot tones exist symmetrically with respect to a DC, the estimating of the amplitude difference and the phase difference comprises estimating the amplitude difference and the phase difference using Equation 21:

$$\hat{\varepsilon} = \left| \frac{a_1^*(-k) - a_2(-k)}{a_1^*(-k) + a_2(-k)} \right| - 1 \qquad (21)$$

$$\hat{\phi} = \angle \frac{a_1^*(-k) - a_2(-k)}{a_1^*(-k) + a_2(-k)} - 1.$$

where
$\hat{\varepsilon}$
is an amplitude difference,
$\hat{\phi}$
is a phase difference,
 $\alpha_1^*(-k)$ is $K_1^*H^*(-k)$, $\alpha_2(-k)$ is $K_2H^*(-k)$,
 $K_1 = (\frac{1}{2})(1+(1+\epsilon)\exp(-j\phi))$,
 $K_2 = (\frac{1}{2})(1-(1+\epsilon)\exp(j\phi))$,
 and H(k) is a channel of a subcarrier k.

9. The method of claim 8, wherein the estimating of the amplitude difference and the phase difference comprises comparing the pilot tones with a noise and selecting a pilot tone greater than the noise.

10. The method of claim 8, wherein the estimating of the amplitude difference and the phase difference comprises selecting a pilot tone having higher correlation than those of adjacent pilot tones.

11. The method of claim 7, wherein when the pilot tones do not exist symmetrically with respect to a Direct Current (DC), the estimating of the amplitude difference and the phase difference comprises estimating the amplitude difference and the phase difference using Equation 22:

$$\hat{\varepsilon} = \left| \frac{D_m^*(-k) - D_m(k)}{D_m^*(-k) + D_m(k)} \right| - 1 \qquad (22)$$

$$\hat{\phi} = \angle \frac{D_m^*(-k) - D_m(k)}{D_m^*(-k) + D_m(k)}.$$

where
$\hat{\varepsilon}$
is an amplitude difference,
$\hat{\phi}$
is a phase difference, and $D_m(k)$ is a received signal at a subcarrier k of an m-th OFDM symbol.

12. The method of claim 11, wherein the estimating of the amplitude difference and the phase difference comprises comparing the pilot tones with a noise and selecting a pilot tone greater than the noise.

* * * * *